US010083173B2

(12) United States Patent
Boutcher et al.

(10) Patent No.: US 10,083,173 B2
(45) Date of Patent: Sep. 25, 2018

(54) ARTIFICIAL INTELLIGENCE BASED LANGUAGE INTERPRETATION SYSTEM

(71) Applicant: Language Line Services, Inc., Monterey, CA (US)

(72) Inventors: James Boutcher, Carmel, CA (US); Scott Swanson, Salinas, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 14/703,018

(22) Filed: May 4, 2015

(65) Prior Publication Data

US 2016/0328387 A1 Nov. 10, 2016

(51) Int. Cl.
*G06F 17/28* (2006.01)
*G06F 17/27* (2006.01)

(52) U.S. Cl.
CPC ............ *G06F 17/28* (2013.01); *G06F 17/27* (2013.01)

(58) Field of Classification Search
CPC ....... G06F 17/2827; G06F 17/28; G06F 17/27
USPC .......................................................... 704/9
See application file for complete search history.

(56) References Cited

U.S. PATENT DOCUMENTS

| | | | |
|---|---|---|---|
| 9,213,693 B2 * | 12/2015 | D'Penha | G06F 17/2836 |
| 2006/0206310 A1 * | 9/2006 | Ravikumar | G06F 17/275 |
| | | | 704/9 |
| 2010/0121629 A1 * | 5/2010 | Cohen | G06F 17/28 |
| | | | 704/2 |
| 2010/0223050 A1 * | 9/2010 | Kelly | G06Q 30/02 |
| | | | 704/8 |
| 2013/0238732 A1 * | 9/2013 | Zhang | G06Q 30/0269 |
| | | | 709/206 |
| 2015/0243279 A1 * | 8/2015 | Morse | G10L 15/183 |
| | | | 704/2 |
| 2015/0348548 A1 * | 12/2015 | Piernot | G10L 15/22 |
| | | | 704/235 |
| 2016/0162477 A1 * | 6/2016 | Orsini | H04L 51/12 |
| | | | 704/2 |

* cited by examiner

*Primary Examiner* — Bharatkumar S Shah
(74) *Attorney, Agent, or Firm* — Patent Ingenuity, P.C.; Samuel K. Simpson

(57) ABSTRACT

A system, computer program product, and process are provided for artificial intelligence based language interpretation. A storage device has a terminology database that stores a plurality of terms utilized in a previous communication requesting a product and/or a service in a first spoken language, a plurality of responses in a second spoken language to the communication, and (a plurality of outcomes based upon the plurality of responses. The second spoken language being distinct from the first spoken language. Further, a processor learns to generate responses associated with corresponding terms in a request based upon an analysis of the plurality of outcomes from the terminology database, receives a request for a product and/or service in the first spoken language in a current communication, and generates a message having a response that is associated with a term present in the request.

17 Claims, 13 Drawing Sheets

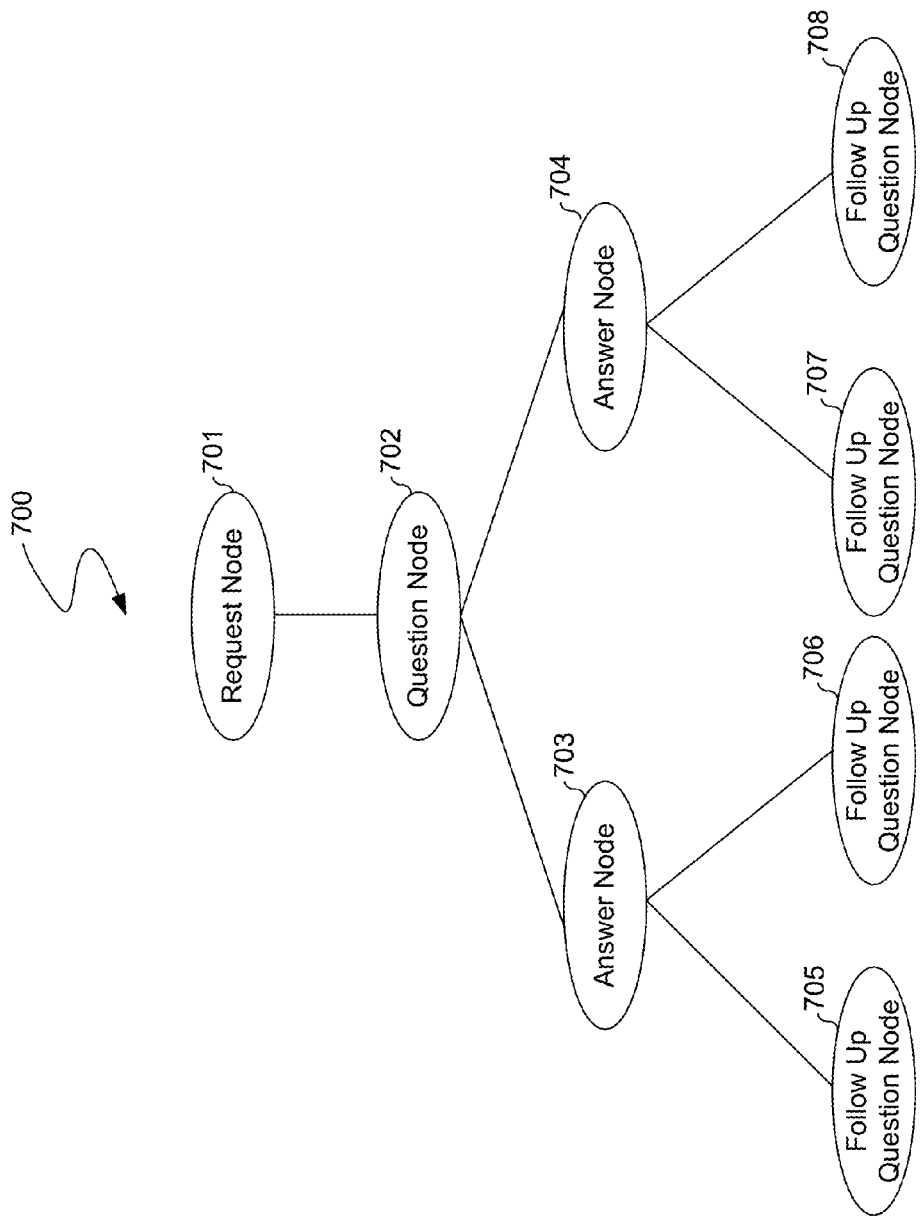

ARTIFICIAL INTELLIGENCE BASED LANGUAGE INTERPRETATION SYSTEM

BACKGROUND

1. Field

This disclosure generally relates to the field of language interpretation. More particularly, the disclosure relates to artificial intelligence ("AI") systems for language interpretation.

2. General Background

Many current service and/or product procurement systems currently necessitate that a human requestor communicates with a human representative of an entity from which the human requestor is requesting the services and/or products. Such service and/or product procurement systems necessitate such communication when the procurement request may have to be significantly customized from customer to customer. An example of such service and/or product procurement system is an emergency response system in which emergencies and the necessary responses to those emergencies can vary from emergency to emergency.

Many current emergency response systems provide users with the ability to request emergency response services such as police, medical, and firefighting services in the event of an emergency. For instance, a user in an emergency situation typically utilizes a telephone to place a phone call to a public safety access point ("PSAP") to request such services. The PSAP is a call center that receives the telephone call from the user, routes the telephone call to a PSAP representative that communicates with the caller to determine the necessary emergency services in addition to other information pertinent to the particular location and emergency, and dispatches the corresponding emergency services to the caller. As an example, the caller can place a telephone call to a predefined telephone number such as 911 to speak with a call taker at a PSAP such as a 911 call center.

If the user in the emergency situation has limited English proficiency ("LEP"), the PSAP routes the communication to a language interpretation platform that can provide a language interpreter for the communication between the PSAP representative and the user if a language interpreter speaking both the language of the PSAP representative, e.g., English, and the language of the user, e.g., Spanish, are available. Such current configurations are limited in providing effective communications if a language interpreter speaking both languages is unavailable at the time of the LEP communication with the PSAP representative. For example, the LEP may speak a language that is not commonly spoken for which the language interpretation platform does not have any language interpreters. As another example, the language interpretation platform may have interpreters that speak the language spoken by the LEP, but that are not available at the time of the LEP communication with the PSAP representative.

As emergency response systems are often utilized in situations where immediate communication is necessary, a time delay for an interpreter to be available or a lack of any interpreter that can be available reduces the ability of the emergency response system to respond to the emergency. As a result, a person that has limited English proficiency ("LEP") would not be able to communicate effectively with a PSAP call taker. Therefore, the LEP may or may not receive the necessary emergency services in time to obviate or mitigate the emergency situation.

Therefore, current service and/or product procurement service configurations are not adequate for providing communication between a human representative and an LEP when a language interpreter is not readily available. Such deficiencies in current service and/or product procurement service configurations may prevent effective dispatching of services and/or products in time sensitive situations.

SUMMARY

A system, computer program product, and process are provided for artificial intelligence based language interpretation. A storage device has a terminology database that stores a plurality of terms utilized in a previous communication requesting a product and/or a service in a first spoken language, a plurality of responses in a second spoken language to the communication, and a plurality of outcomes based upon the plurality of responses. The second spoken language is distinct from the first spoken language. Further, a processor learns to generate responses associated with corresponding terms in a request based upon an analysis of the plurality of outcomes from the terminology database, receives a request for a product and/or service in the first spoken language in a current communication, and generates a message having a response that is associated with a term present in the request.

The communication may be provided in various formats. For example, the communication may be a voice communication, a video communication, a text based communication, an image based communication, etc.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 7A illustrates an example of the format of a tree based learned behavior model.

DETAILED DESCRIPTION

Figure 1:
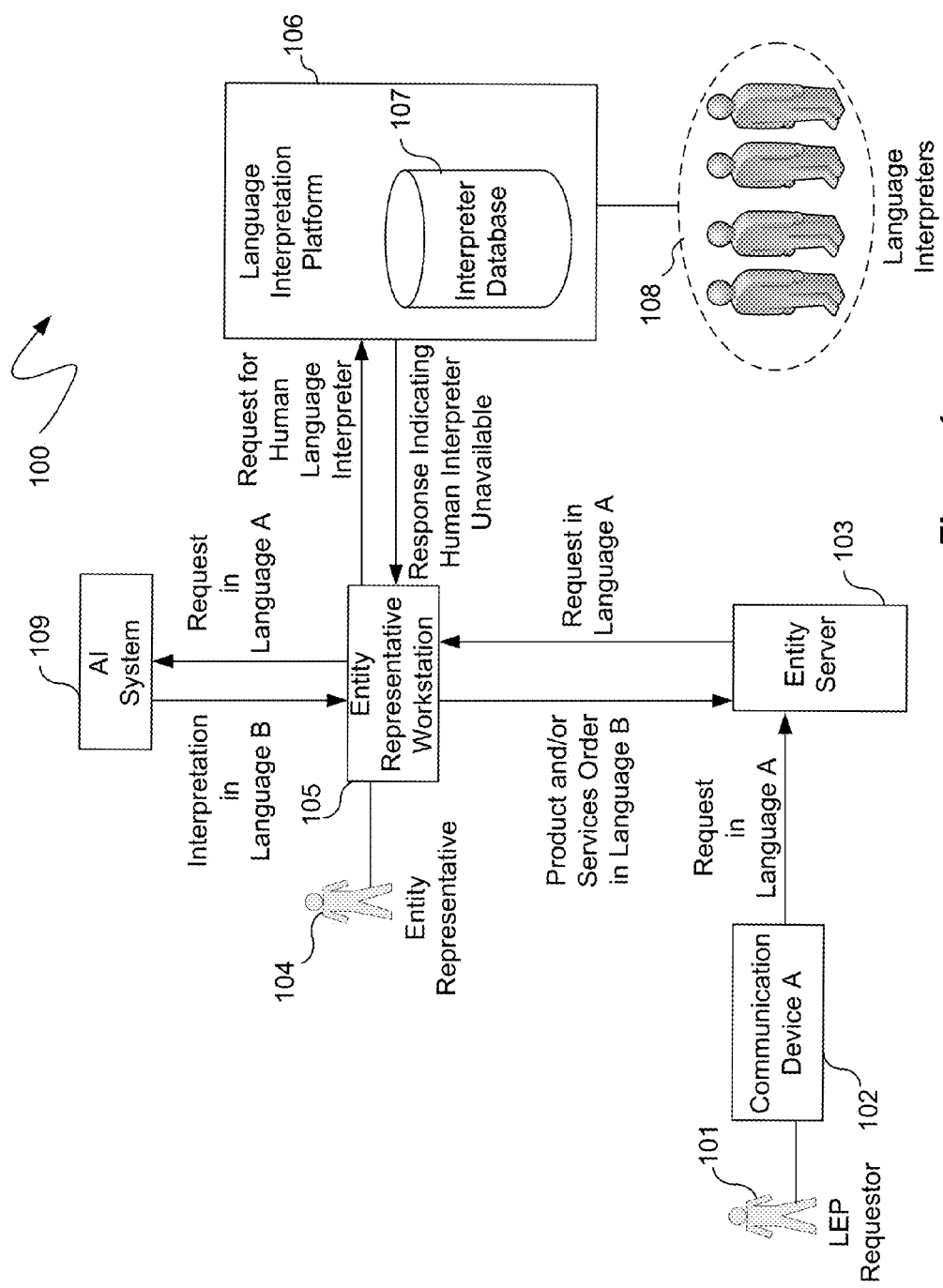
FIG. 1 illustrates an AI based language interpretation configuration.

An AI based language interpretation system is provided to either assist a human representative of an entity with fulfilling a request of a human requester or fulfill the request of the human requester in an automated manner. As an example, the AI based language interpretation system can be implemented to assist PSAP representatives in requesting the necessary emergency services for particular emergency situations. As another example, the AI based language interpretation system can be implemented to communicate directly with the human requester, e.g., the LEP, to obtain data that helps the AI based language interpretation system determine what emergency response services are necessary for the particular emergency situation. The AI based language interpretation system can then send requests for such services to human emergency service responders.

The AI based language interpretation system can be trained to understand and communicate in languages that are commonly spoken in addition to languages that are not commonly spoken. Therefore, the AI based language interpretation system removes the problems encountered by current language interpretation systems of relying on the availability of human language interpreters that speak both the language of an entity representative and an LEP requesting products and/or services.

Thus, the AI based language interpretation system improves the functionality of entity communication systems, e.g., a PSAP call center, by improving the processing speed at which requests for services and/or products can be fulfilled. For instance, the entity communication system can request a human language interpreter from a language interpretation platform, but can quickly obtain assistance from the AI based language interpretation system if a human language interpreter is not immediately available rather than having to wait for such human language interpreter to be available. Therefore, the entity communication systems, which may be implemented on a computing device such as a server computer, personal computer ("PC"), laptop computer, smartphone, tablet device, etc., can operate in a more efficient manner by utilizing the AI based language interpretation system in conjunction with a language interpretation platform that utilizes human language interpreters when available rather than relying only on the language interpretation platform to wait for human language interpreter availability. Further, the entity communication systems may be implemented to rely on the AI based language interpretation platform without communicating with a language interpretation platform, which improves the processing speed of providing products and/or services by eliminating the communication time for communicating with the language interpretation platform.

The example of emergency response services is provided only as an example. The AI based language interpretation system may be utilized in a variety of other contexts for which an entity representative that is human communicates with a human requestor of products and/or services.

FIG. 1 illustrates an AI based language interpretation configuration 100. The AI based language interpretation configuration 100 has an LEP requestor 101 that requests a product and/or a service, e.g., an emergency response service, in a first spoken language, e.g., Spanish, through a communication device A 102. The communication device A 102 can be a computing device, e.g., a smartphone, tablet device, PC, laptop computer, set top box, etc., a telephone connected to a public switched telephone network ("PSTN") network, a telephone connected to a Voice over IP ("VOIP") network, a feature cellular phone connected to a cellular network, or any other type of device utilized for communication.

The request may be provided through a variety of forms of communication. For example, voice, audio, video, image, and/or text can be utilized to send and receive communications at the communication device A 102. Further, any responses or any other communications provided by different systems and/or components of the AI based language interpretation configuration 100 may also be provided through such forms of communication.

The communication device A 102 sends the request to an entity server 103. The entity server 103 is a computing device that routes the request in the first spoken language to humans and/or computing devices that can obtain information from the LEP requestor 101 to help the entity server 103 process an accurate order for the product and/or service requested by the LEP requestor 101.

The request may be provided to the entity server 103 through an automated system such as an interactive voice response ("IVR") system or through a live representative to which the request is directed by the entity server 103. The entity server 103 may have a receiver, input device, etc., for receiving the request.

For instance, the request from the LEP requestor 101 may necessitate particular customization. Therefore, the entity server 103 sends the request to an entity representative 104 through an entity representative workstation 105. In that example, the entity representative 104 does not speak the first spoken language of the LEP 101. Therefore, the entity representative workstation 105 forwards the request in the first spoken language to a language interpretation platform 106 that provides language interpretation services. The language interpretation platform 106 can be implemented on at least one computing device, e.g., at least one server. The language interpretation platform 106 receives a request for language interpretation and routes the communication to a language interpreter 108 that speaks the requested languages and is available.

The request may be provided to the language interpretation platform 106 through an automated system such as an IVR system or through a live representative to which the request is directed by the language interpretation platform 106. The language interpretation platform 106 may have a receiver, input device, etc., for receiving the request.

The language interpretation platform 106 maintains an interpreter database 107 that stores various information associated with language interpreters, which perform language interpretation for the language interpretation platform 106. For example, the interpreter database 107 stores status information indicating the availability status of each of the plurality of language interpreters 108 and the corresponding language spoken by each of the language interpreters 108.

If the language interpretation platform 106 determines that no language interpreter 108 is currently available to perform language interpretation between the LEP requestor 101 and the entity representative 104, the language interpretation platform sends a communication with such an indication to the entity representative 104 through the entity representative workstation 105. The entity representative 104 may decide to wait until the language interpretation platform 106 provides an indication that a language interpreter 108 is available, but such a wait does not provide optimal customer service to the LEP 101 and may not be practical in an emergency situation that is time sensitive. Therefore, the entity representative 104 can utilize the entity representative workstation 105 to send the request in the first spoken language to the AI system 109. In one implementation, the language interpretation platform 106 can automatically send the request to the AI system 109 after determining that a language interpreter 108 is not available. In another implementation, the entity representative workstation 105 can automatically send the request to the AI system 109 without having to wait for the entity representative 104 to manually request help from the AI system 109.

The AI system 109 can perform a word for word interpretation of the request from the LEP requestor 101 from the first spoken language, e.g., Spanish, to the language spoken by the entity representative 104, e.g., English. Further, the AI system 109 can utilize context data and particular terminology of the request from the LEP requestor 101 to provide recommended responses and/or recommended follow up questions to the entity representative 104 so that the entity representative 104 may proceed with processing an order for the requested product and/or service or proceed with sending follow up questions to the LEP requestor 101 to obtain more information that will help the entity representative 104 and/or the AI system 109 determine with accuracy the particular details of the request from the LEP requestor 101.

The AI system 109 determines the recommended responses and/or recommended follow up questions based upon learned behavior from previous LEP requestor requests. For example, humans and/or computing devices may be utilized to teach the AI system 109 the types of outcomes that have previously resulted in requests having certain terms appearing in particular contexts. The AI system 109 can be programmed to select the responses and/or follow up questions that led to outcomes that provided a high level of customer service, e.g., obviated or mitigated an emergency situation.

In one embodiment, the AI system 109 sends the recommended responses and/or follow up questions in the first spoken language and the second spoken language to the entity representative 104. The entity representative 104 can then determine which response and/or follow up question should be sent to the entity server 103. For example, the AI system 109 may have enough information from the request provided by the LEP requestor 101 to recommend that the entity representative 104 proceed with placing an order for a product and/or a service with the entity server 103. As another example, the AI system 109 may not have enough information from the request provided by the LEP requestor 101 and may, therefore, provide a recommended follow up question to the entity representative 104 for forwarding in the first spoken language to the entity server 103 to then forward to the LEP requestor 101. Further iterations of such communications can be provided until the AI system 109 recommends a response that the entity representative 104 determines to be practical based upon the received language interpretations from the AI system 109.

In another embodiment, the AI system 109 communicates directly with the entity server 103 after the entity representative 104 requests help from the AI system 109. The AI system 109 can provide follow up questions to the LEP requestor 101 through the entity server 103 and then send a response to the request to the entity server 103, which places an order for a product and/or a service. In other words, the AI system 109 can select the most optimal follow up questions and/or responses rather than providing recommendations to a human entity representative 105 to perform such a selection. The human entity representative 105 may monitor language interpretations, which are generated by the AI system 109, of the follow up questions and/or responses so that the human entity representative 105 may intervene if the human entity representative 105 deems necessary.

Although the AI system 109 can provide a word for word interpretation to the entity representative 104, the meaning of those words may carry different weight in different languages. For instance, a word for word language interpretation may not convey the urgency of a request since that word may have significantly more urgency in the spoken dialect of the first spoken language than the second spoken language. The AI system 109 learns such significance based upon being taught what terms have been utilized in previous requests and the corresponding outcomes. Therefore, the AI system 109 is able to provide the human entity representative 104 with recommendations that would be difficult to convey with a word for word interpretation.

Figure 2:
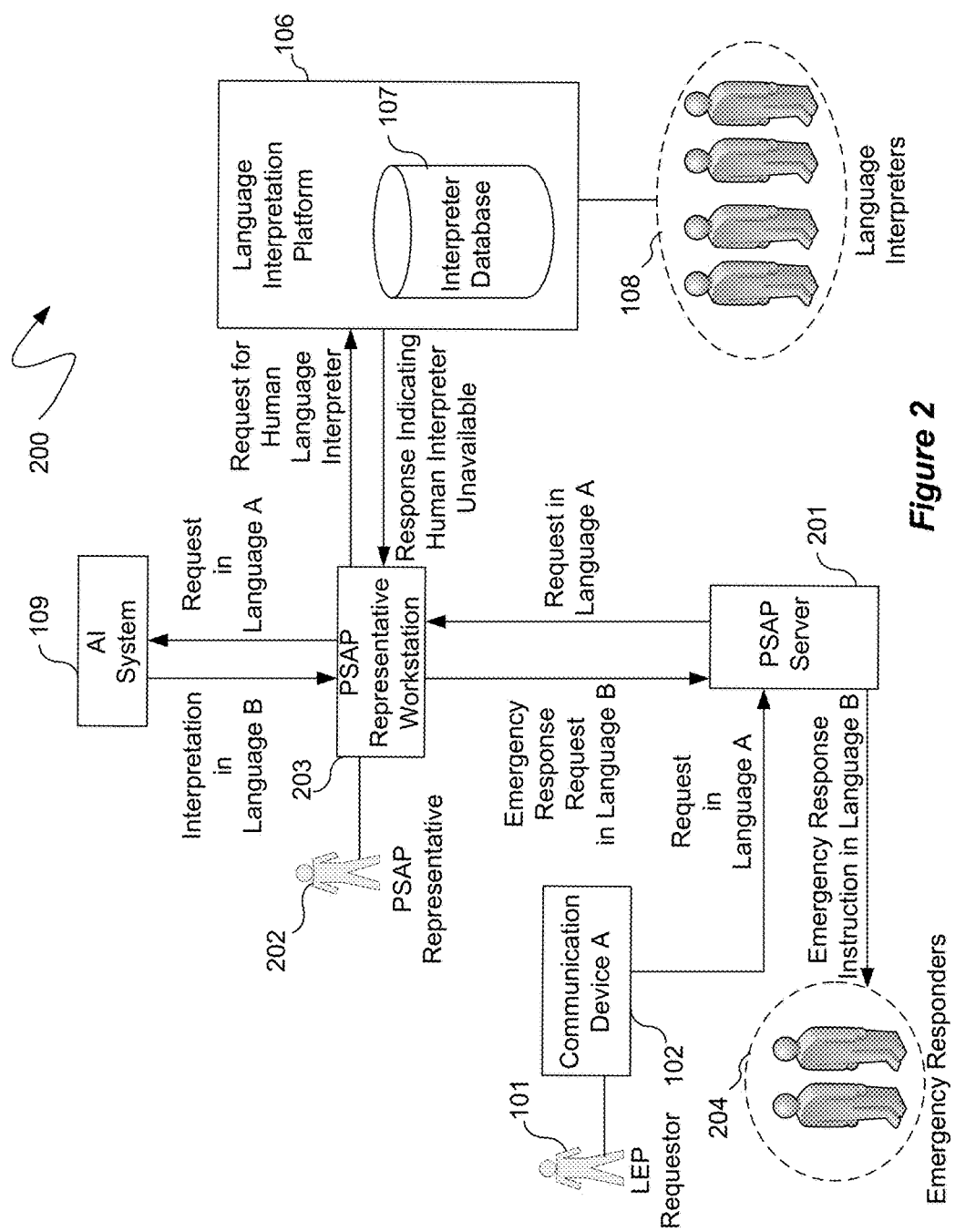
FIG. 2 illustrates an example of an emergency response AI based language interpretation configuration.

FIG. 2 illustrates an example of an emergency response AI based language interpretation configuration 200. The emergency response AI based language interpretation configuration 200 has the LEP requestor 101 utilizing the communication device A 102 to send the request in the first spoken language to a PSAP server 201. For example, the PSAP server 201 is a server located at or in communication with a 911 call center. The PSAP server 201 sends the request in the first spoken language to a PSAP representative 202 through a PSAP representative workstation 203. After attempting to obtain a human language interpreter 108 through the language interpretation platform 106 and receiving an indication from the language interpretation platform 106 that a human language interpreter 108 proficient in the first spoken language and the second spoken language is unavailable, the PSAP representative 202 utilizes the PSAP representative workstation 202 to request help from the AI system 109. The AI system 109 can iterate through recommended follow up questions until having enough information for the emergency described by the LEP requestor 101 to recommend a particular emergency service to the PSAP representative 202 for forwarding to the PSAP server 201 or to send an instruction to the PSAP server 201 ordering the emergency response. The AI system 109 can prepare the instruction in a spoken language spoken by emergency responders 204. For example, the emergency responders 204 may speak a different language than the PSAP representative 202. The PSAP server 201 can then send the emergency response instruction to the emergency responders 204 to respond to the LEP requestor 101.

Although the example of an emergency response system is provided, the AI system 109 can be utilized in a variety of contexts that may or may not be time sensitive. For example, the AI system 109 can be utilized to improve ordering efficiency of products and/or services.

Figure 3:
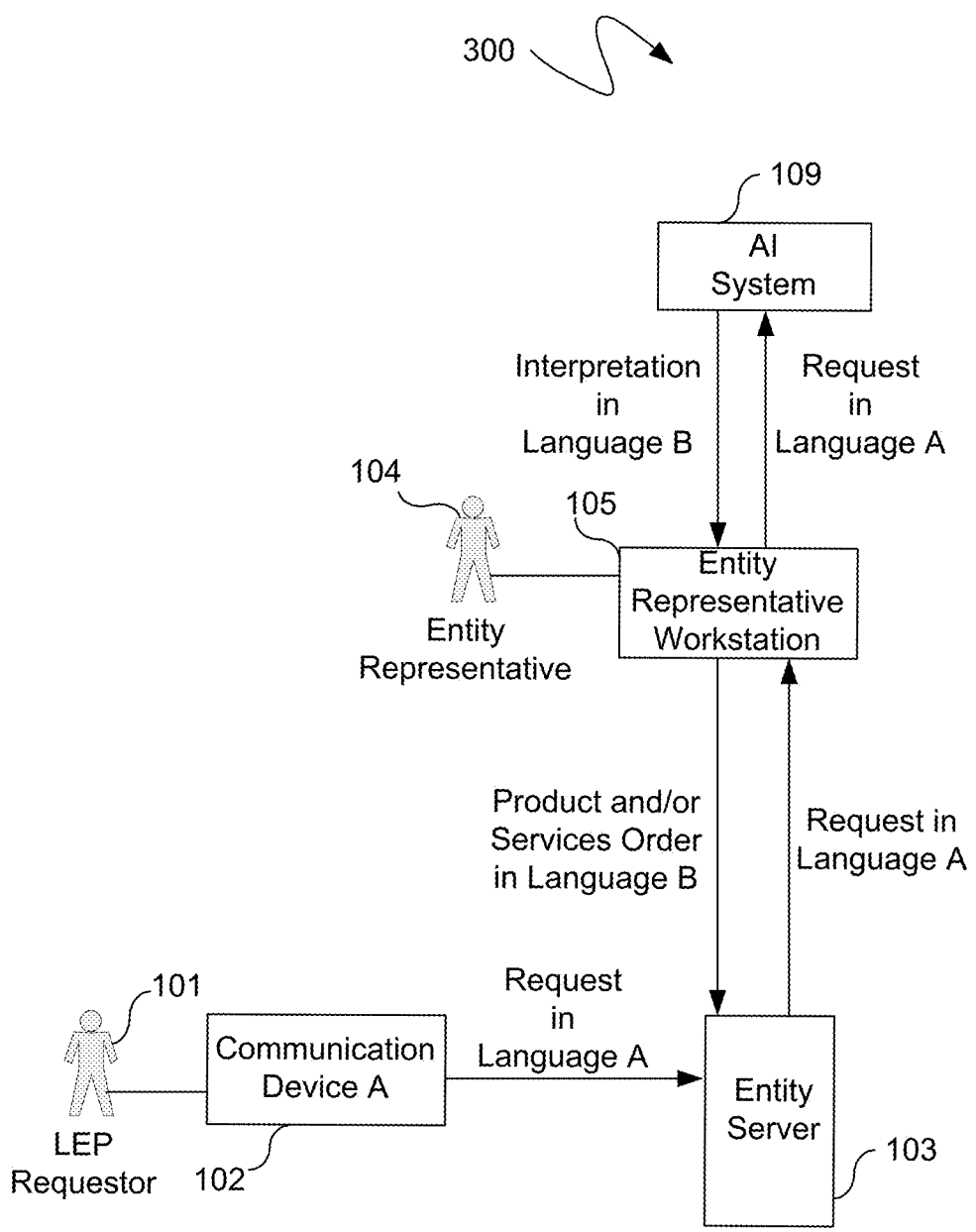
FIG. 3 illustrates an alternative configuration to that of the AI based language interpretation configuration illustrated in FIG. 1.

FIG. 3 illustrates an alternative configuration 300 to that of the AI based language interpretation configuration 100 illustrated in FIG. 1. The alternative configuration 300 has the same components of the AI based language interpretation configuration 100 illustrated in FIG. 1 without the language interpretation platform 106 and the interpreter database 107. The alternative configuration 300 has an entity representative workstation 105 that automatically requests help from the AI system 109 without having to wait for an indication of whether or not a human language interpreter 108 is available through a language interpretation platform 106. For example, a time sensitive situation such as an emergency situation may not be conducive to waiting for a determination of human interpreter 108 availability.

Figure 4:
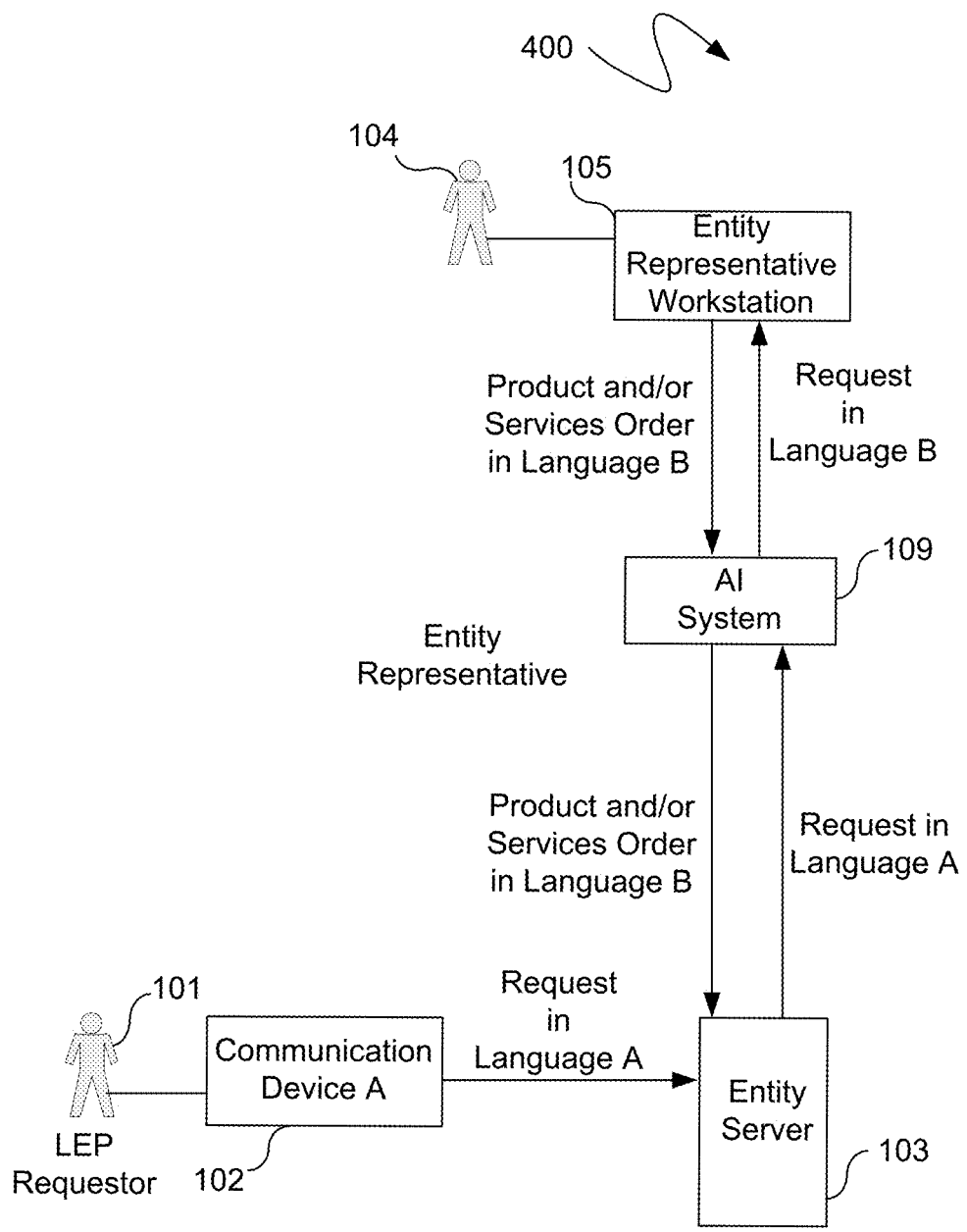
FIG. 4 illustrates yet another alternative configuration to that of the AI based language interpretation configuration illustrated in FIG. 1.

FIG. 4 illustrates yet another alternative configuration 400 to that of the AI based language interpretation configuration 100 illustrated in FIG. 1. The alternative configuration 400 has the AI system 109 situated between the entity server 103 and the entity representative workstation 105. The AI system 109 receives the request in the first spoken language from the entity server 103 and then forwards a language interpretation of the request to the entity representative 104 through the entity representative workstation 105. In other words, the entity representative does not have to receive messages in the language spoken by the LEP requestor 101. The AI system 109 can also send recommended follow up questions and/or responses in the language spoken by the entity representative 104.

The AI system 109 can also be utilized to select the entity representative 104. For instance, the AI system 109 can analyze the request provided by the LEP requestor 101 and determine based upon terms utilized in the request and the learned behavior of the AI system 109 that a particular expertise in a certain field is necessary. The AI system 109 can then select and route the request to the entity representative 104 with that particular expertise.

Figure 5:
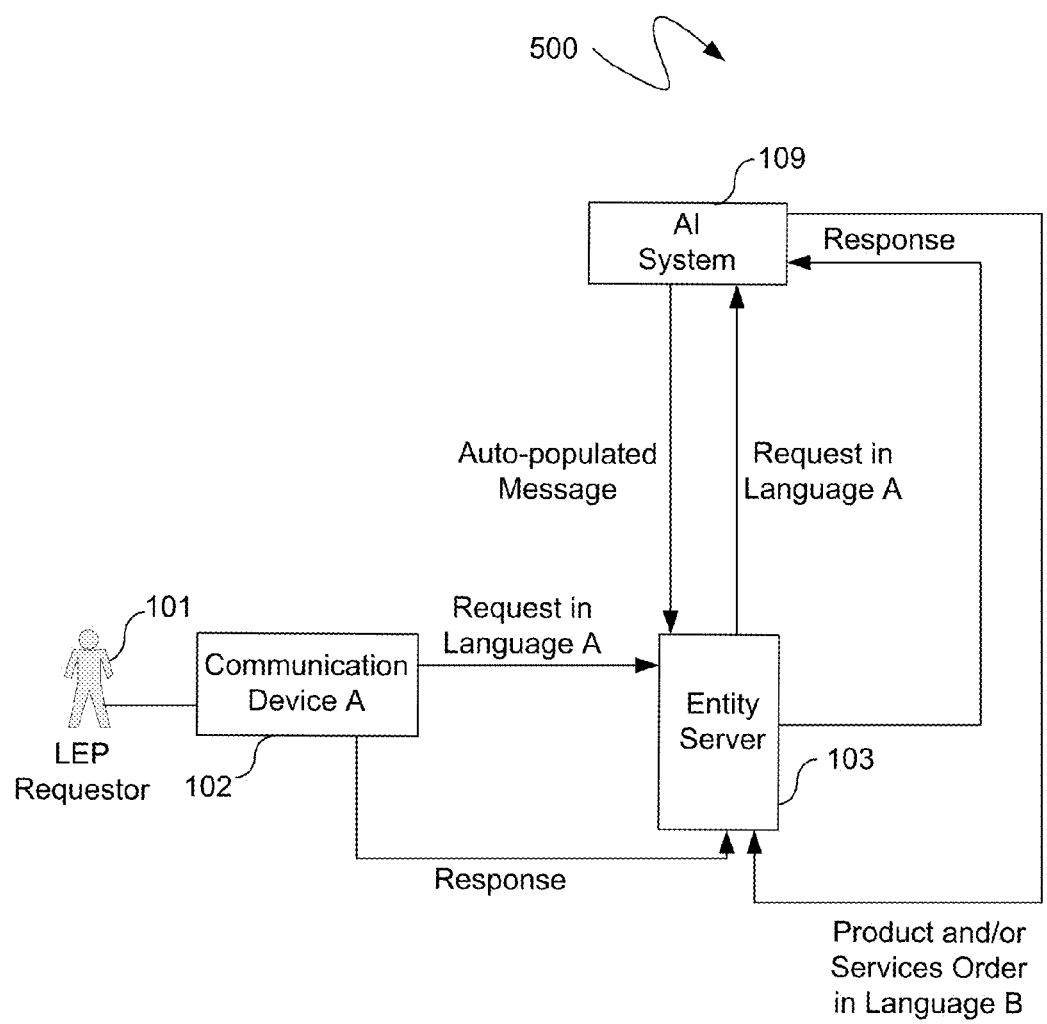
FIG. 5 illustrates another alternative configuration to that of the AI based language interpretation configuration illustrated in FIG. 1.

FIG. 5 illustrates another alternative configuration 500 to that of the AI based language interpretation configuration 100 illustrated in FIG. 1. The alternative configuration 500 has the same components of the AI based language interpretation configuration 100 illustrated in FIG. 1 without any human representatives or human language interpreters that participate in the language interpretation process for responding to the request of the LEP requestor 101. The AI system 109 receives the request from the LEP requestor 101 from the entity server 103 and prepares auto-populated messages for follow up questions to the LEP requestor 101. For example, the communication device A 102 may be a smartphone that is capable of sending and receiving text messages. The request is sent as a text message from the LEP requestor 101 through the communication device A 102 as the LEP requestor 101 may be in an emergency situation in which sending text messages is more feasible than having a voice communication. The AI system 109 generates follow up questions or phrases to quickly obtain more information from the LEP requestor 101 to help the AI system 109 in accurately ordering the product and/or the service requested by the LEP 101. The AI system 109 selects the follow up questions or phrases based upon the occurrence of the lack of an occurrence of certain other terms in the request. For instance, the AI system 109 can have learned behavior, e.g., selection of follow up questions or responses, based upon certain terms or phrases in previous communications with other LEPs having a high statistical probability associated with outcomes that obviate or minimize emergency situations.

Figure 6A:
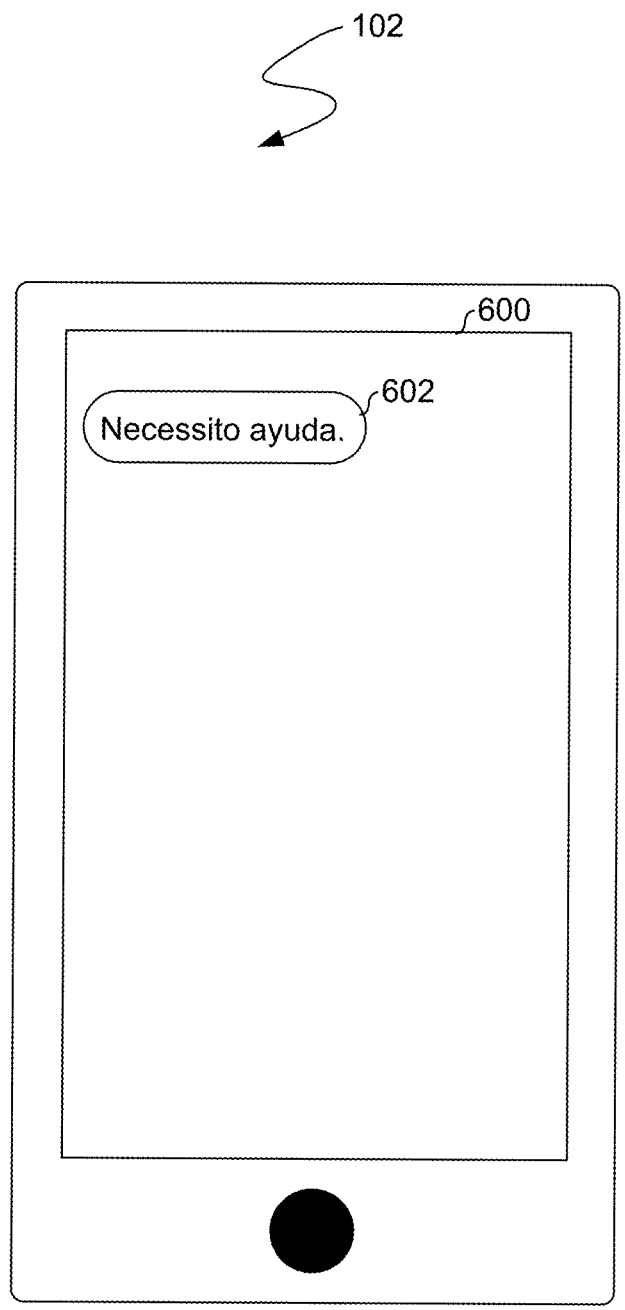
FIG. 6A illustrates the communication device illustrated in FIG. 1.

FIGS. 6A-6D illustrate example screen shots of text messages sent and received between the LEP requestor 101 and the AI system 109 according to the alternative configuration 500 illustrated in FIG. 5. FIG. 6A illustrates the communication device A 102 illustrated in FIG. 1. The communication device A 102 has a display screen 600. Further, the display screen 600 displays a text message 602 composed by the LEP requestor 101 and sent to the entity server 103 illustrated in FIG. 5. As an example, the text message states in Spanish "Necessito ayuda," which means "I need help" in English. The entity server 103 forwards that message in Spanish to the AI system 109. The AI system 109 analyzes the phrase and the terms present in that phrase. For example, the AI system 109 may have learned that a substantial percentage of requests in Spanish from LEPs utilizing the word "ayuda" were often associated with danger. Alternatively, the AI system 109 may have obtained such data without an analysis of previous requests, i.e., such statistical data may have been provided to the AI system 109 or retrieved by the AI system 109.

Figure 6B:
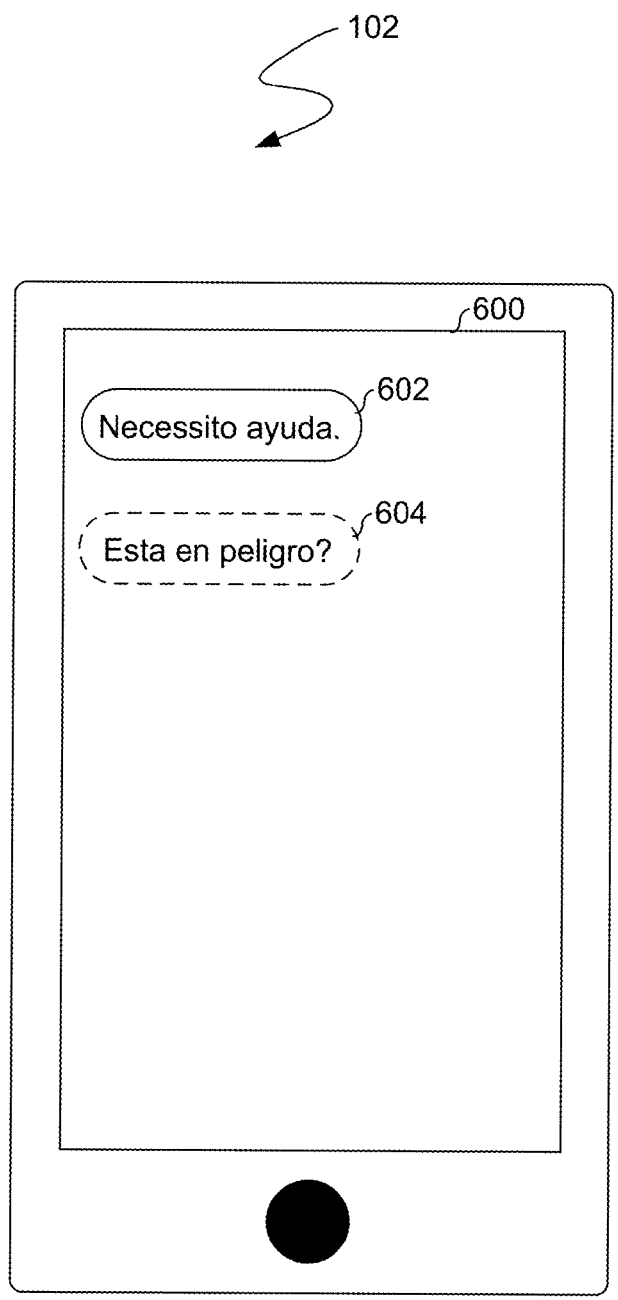
FIG. 6B illustrates an example of a follow up question generated by the AI system.

FIG. 6B illustrates an example of a follow up question generated by the AI system 109. To verify that the request from the LEP 109 is a similar situation, the AI system 109 sends a text message in Spanish stating "Esta en peligro?", which means "Are you in danger?" in English. By determining if the LEP requestor 101 is in a dangerous situation, the AI system 109 is able to determine further follow questions and/or responses associated with high statistical probability outcomes.

Figure 6C:
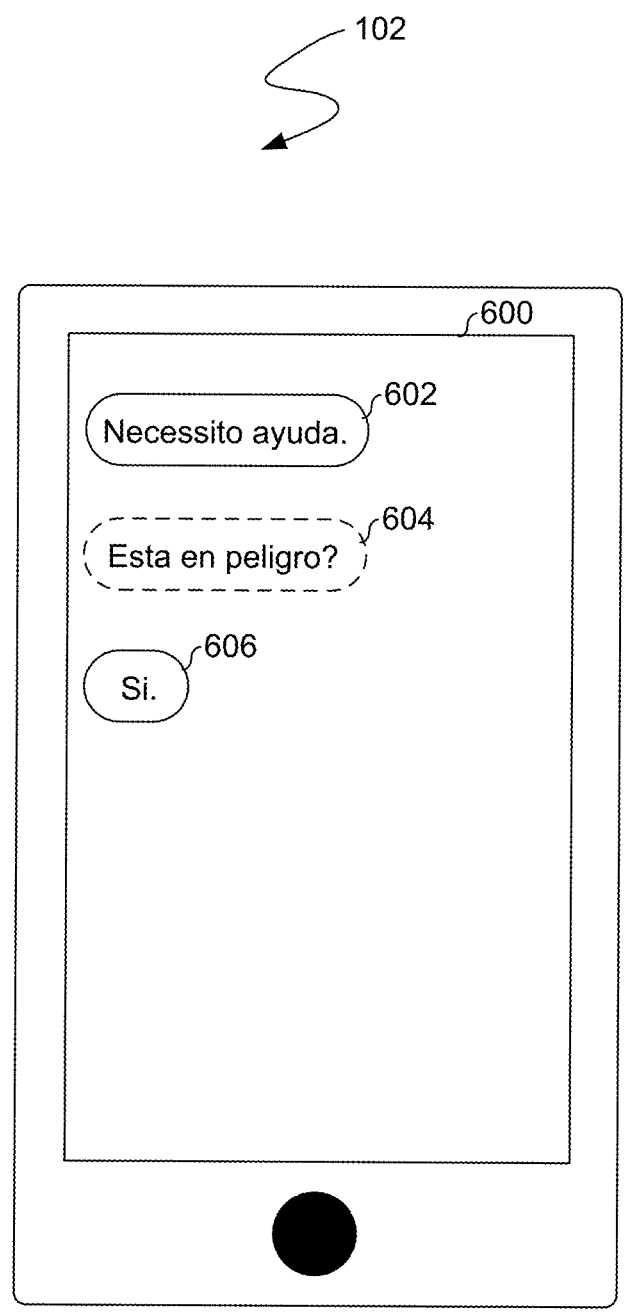
FIG. 6C illustrates an example of an LEP requestor response to the follow up question illustrated in FIG. 6B.

FIG. 6C illustrates an example of an LEP requestor 101 response to the follow up question illustrated in FIG. 6B. FIG. 6C illustrates a text message 606 from the LEP requestor 101 stating the phrase "Si," which means "Yes" in English.

Figure 6D:
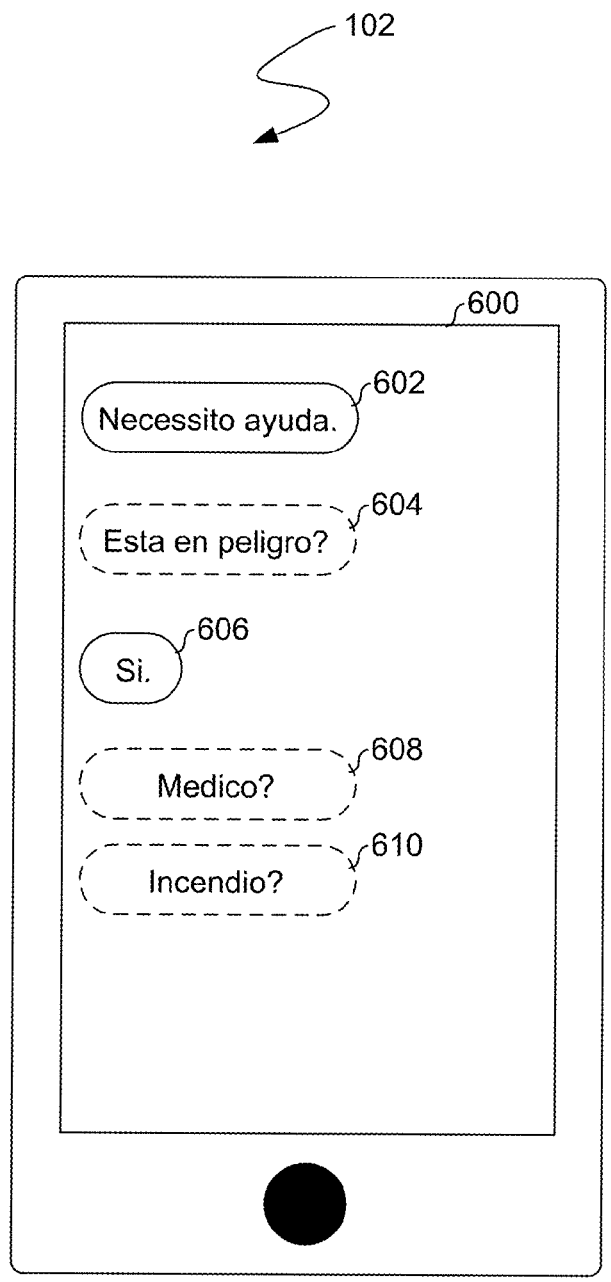
FIG. 6D illustrates yet another follow up question generated by the AI system.

FIG. 6D illustrates yet another follow up question generated by the AI system 109. The AI system 109 determines a plurality of possible scenarios having a high statistical probability of association with previous requests from other LEP requestors speaking Spanish that have provided similar requests and have answered similarly to the auto-populated messages generated by the AI system 109. For example, the AI system 109 may determine that medical and/or fire emergencies have a high statistical probability of being associated with similar types of requests and responses. Therefore, the AI system 109 generates a text message 608 stating "Medico?", which means "Medical?" in English, and a text message 610 stating "Incendio?", which means "Fire?" in English. The AI system 109 can then receive text and/or other communication based responses from the LEP requestor 101 to generate further follow up questions and/or instructions to the entity server 103 that are forwarded to emergency responders 204.

Although the auto-populate features of the AI system 109 are discussed and illustrated with respect to the alternative configuration illustrated in FIG. 5, the auto-populate features of the AI system 109 may be utilized by any of the configurations provided for herein. For example, the AI system 109 may auto-populate messages in the first spoken language of the LEP requestor 101 and the second spoken language of the entity representative 104 to help the entity representative 104 determine which auto-populated messages should be sent to the LEP requestor 101. The AI system 109 may also generate recommendations to help the entity representative 104 determine which auto-populated messages to send to the LEP requestor 101.

Figure 7B:
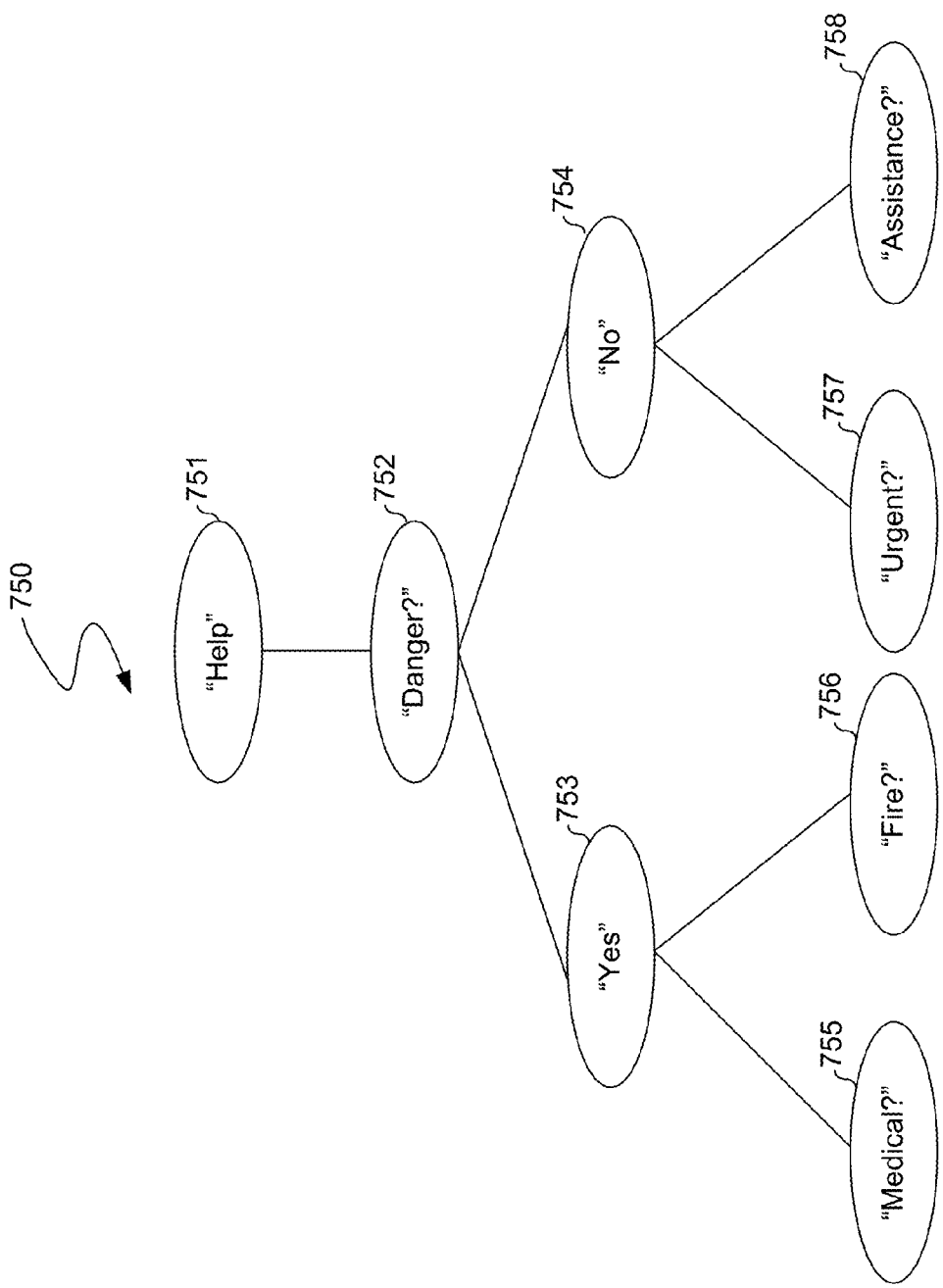
FIG. 7B illustrates an example of a tree based learned behavior model.

The AI system 109 illustrated in FIGS. 1-5 learns to generate various follow up questions, responses, instructions, etc., based upon a learned behavior model. FIGS. 7A and 7B illustrate examples of a tree based learned behavior model that can be utilized by the AI system 109. FIG. 7A illustrates an example of the format of a tree based learned behavior model 700. The tree based learned behavior model 700 has various nodes that each contain various information. The AI system 109 may utilize the tree based learned behavior model 700 in determining questions, follow up questions based on answers provided by the LEP requestor 101, further follow up questions based on further answers provided by the LEP requestor 101, responses, etc. The AI system 109 may utilize a protocol such as statistical probability analysis to determine the path of progression through various nodes of the tree based learned behavior model 700.

For example, the AI system 109 may initiate a determination of follow up question recommendations or follow up auto-populated messages at a request node 701. The request node 701 may include the particular communication, e.g., text, voice, video, image, etc., having the request for the product and/or service received by the entity server 103 from the LEP requestor 101. The AI system 109 may then analyze that communication to determine what terms or phrases are present in that request. Further, the AI system 109 may then review previous requests from other LEPs in the same spoken language having those terms and/or phrases to determine what questions and/or follow up questions resulted in an optimal outcome.

The request node 701 may also include information that is associated with the request, but that is not directly stated by the LEP requestor 101 in the request. For example, the entity server 103 may determine the GPS coordinates of the LEP requestor 101 by analyzing metadata sent in the communication having the request, communicating with the telecommunications provider utilized by the communication device A 102, etc. Such additional information can help the AI system 109 then review previous requests from other LEPs in a similar geographic region. Other metadata such as a user profile can also be utilized by the AI system 109 to review previous requests from other LEPs according to demographics. The AI system 109 can then recommend or auto-populate questions, follow up questions, and responses based upon similar scenarios with a substantial statistical probability of an optimal outcome.

The AI system 109 then proceeds to a question node 702 based upon such determination or based upon a lack of enough information. At the question node 702, the AI system 109 composes the question or selects from other questions based upon such determination or lack of information. Although only question node 702 is illustrated for ease of illustration, a plurality of questions nodes may be utilized in the tree based learned behavior model 700. After the question is provided to the LEP requestor 101, the AI system 109 is aware of possible answer nodes 703 and 704. Based upon what answer is received, the AI system 109 may then proceed to various follow up question nodes. For instance, the AI system 109 progresses to follow up question node 705 or follow up question node 706 if the answer to the question is at the answer node 703. The AI system 109 progresses to follow up question node 707 and follow up question node 708 if the answer to the question is at the answer node 704. The AI system 109 can send a follow up question with the highest statistical probability or may decide to send multiple follow up questions simultaneously to the LEP requestor 101 through the entity server 101 if multiple follow questions have substantial statistical probability.

FIG. 7B illustrates an example of a tree based learned behavior model 750. At request node 750, the AI system 109 determines that the phrase "Help" is present within the communication having the request from the LEP requestor 101 to the entity server 103. Based upon a substantial statistical probability of LEPs speaking the first spoken language in communications to the entity server 103 being in dangerous emergency situations, the AI system 109 proceeds to a question node 752 having the phrase "Danger?" The AI system 109 then sends a message having that phrase as a recommended question or as an auto-populated message to the entity representative workstation 105 or the entity server 103 in the first spoken language or in both the first spoken language and the second spoken language. After receiving a response to the question, the AI system 109 determines if the answer is at a response node 753 having the phrase "Yes" in the first spoken language or at a response node 754 having the phrase "No" in the first spoken language. If the AI system 109 determines that the response from the LEP requestor 101 has the phrase "Yes," the AI system 109 proceeds to the response node 753. The AI system 109 may then determine which follow question node 755 or 756 to proceed to based upon which follow up question has a higher statistical probability of an optimal outcome given the path of progression through the tree based learned behavior model 750. For example, the AI system 109 may determine that medical situations have a higher statistical probability for situations in which LEPs speaking the first spoken language have sent a request having the term "help" and responded to the question having the term "danger" with the term "yes" that fire situations. The AI system 109 may then send the follow up question with the phrase "Medical?" at the follow up question node 755. If the LEP requester 101 responds by stating "No," the AI system 109 may then proceed to the follow up question node 755 to send the follow up question with the phrase "Fire?" Alternatively, the AI system 109 may determine that both follow questions exceed a predetermined threshold with respect to statistical probabilities and send both follow up questions directly or indirectly to the LEP requestor 101.

If the AI system 109 determines that the response from the LEP requestor 101 has the phrase "No," the AI system 109 proceeds to the response node 754. The AI system 109 may then proceed through the tree based learned behavior model 750 in a similar manner to follow up question node 757 having the phrase "Urgent?" and the follow up question node 758 having the phrase "Assistance?"

The types of nodes illustrated in FIGS. 7A and 7B are provided only for illustrative purposes. Various other types of nodes may be utilized by the AI system 109 for various decisions, messages, etc.

Although a tree based model is illustrated in FIGS. 7A and 7B for utilization by the AI system 109, a variety of other types of models may be utilized by the AI system 109. For example, the AI system 109 can be programmed to perform certain actions based upon detection of certain phraseology independent of any probability analysis.

Figure 8:
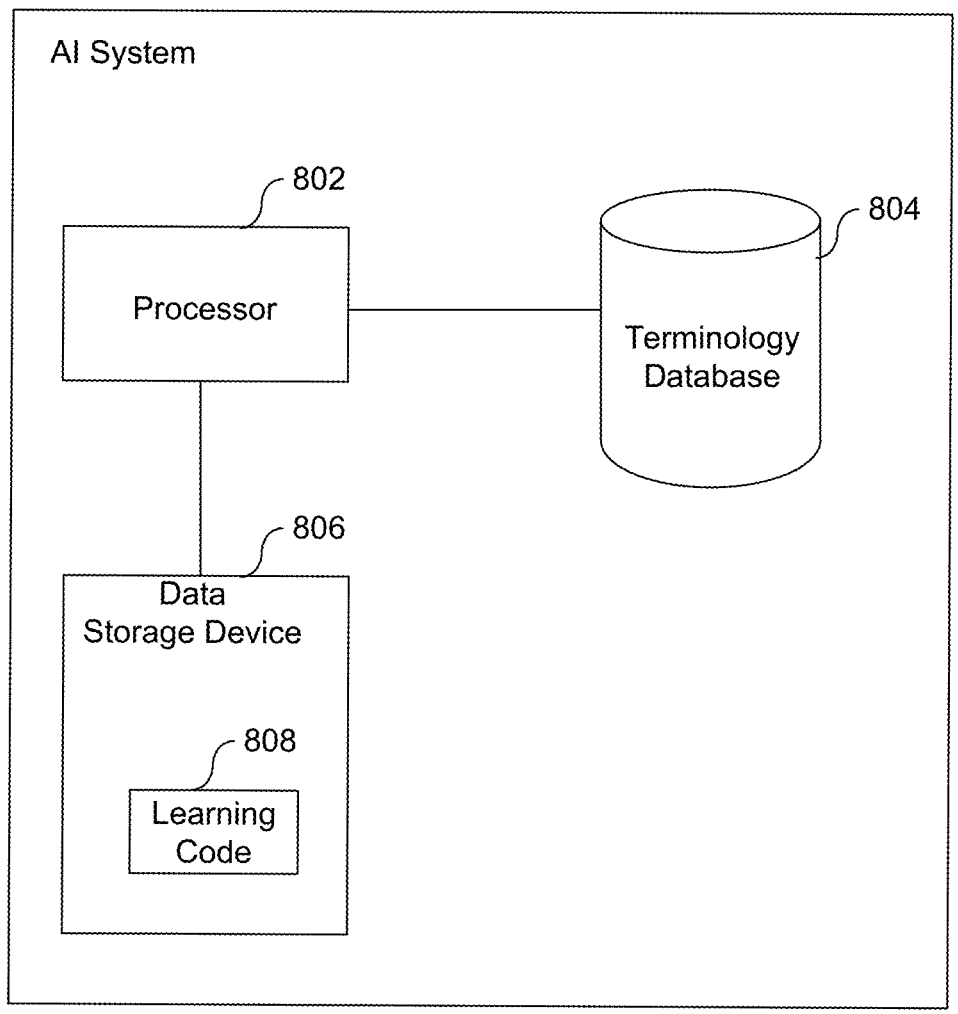
FIG. 8 illustrates the internal components of the AI system.

FIG. 8 illustrates the internal components of the AI system 109. The AI system 109 includes a processor 802 that is in operable communication with a terminology database 804 and a data storage device 806. The terminology database 804 stores previous requests from other LEPs and the terms utilized in the communications for those requests. The terminology database 804 may also store other information such as the outcomes of those requests, e.g., data indicating if an emergency situation was obviated or mitigated. Further, the data storage device includes learning code 808 that the processor 802 utilizes to analyze the data stored in the terminology database 804 so that the processor 802 can learn behavior for subsequent requests from LEPs.

Figure 9:
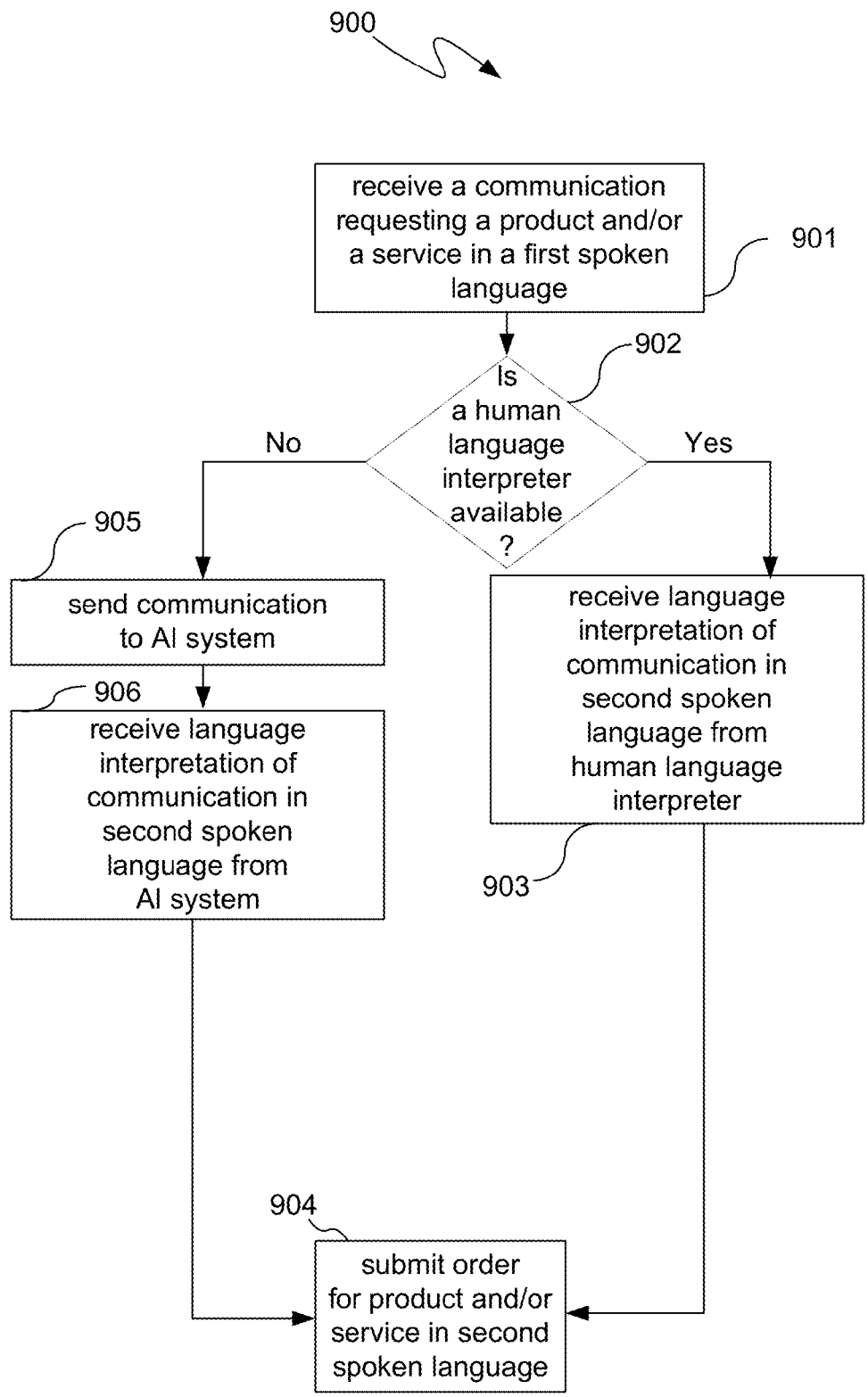
FIG. 9 illustrates a process for obtaining language interpretation assistance from the AI system for the entity representative.

FIG. 9 illustrates a process 900 for obtaining language interpretation assistance from the AI system 109 for the entity representative 104. At a process block 901, the process 900 receives a communication requesting a product and/or a service in a first spoken language. The process 900 then advances to a decision block 902. At the decision block 902, the process 900 determines if a human language interpreter is available. If a human language interpreter is available, the process 900 advances to a process block 903. At the process block 903, the process 900 receives a language interpretation of the communication in the second spoken language from a human language interpreter. The process 900 then advances to a process block 904. At the process block 904, the process 900 submits an order for the product and/or service in the second spoken language.

If the process 900 determines that a human language interpreter is not available at the decision block 902, then the process 900 advances to a process block 905. At the process block 905, the process 900 sends the communication to the AI system 109. The process 900 then advances to a process block 906. At the process block 906, the process 900 receives language interpretation of the communication in the second spoken language from the AI system 109. The process 900 then advances to the process block 904. At the process block 904, the process 900 submits an order for the product and/or service in the second spoken language.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable storage device. The instructions may also be created using source code or any other known computer-aided design tool. A computer readable storage device may be any storage device capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a personal computer, laptop computer, set top box, cell phone, smartphone, tablet device, portable media player, video player, or the like.

The configurations provided for herein may be implemented utilizing a general purpose computer or any other hardware equivalents. Various types of storage devices, e.g., random access memory ("RAM") and/or read only memory (ROM), may be utilized. Further, various input/output devices, e.g., audio/video inputs and outputs, image capture devices, voice capture devices, etc., may be utilized.

The learning code 808 illustrated in FIG. 8 may be represented by one or more software applications, a combination of software and hardware, e.g., using application specific integrated circuits where the software is loaded from a storage device and operated by the processor 802 in a memory of the computer. As such, the learning code 808 and associated data structures may be stored in a computer readable storage device.

It is understood that the computer program products, apparatuses, systems, and processes described herein may also be applied in other types of apparatuses, systems, and processes. Those skilled in the art will appreciate that the various adaptations and modifications of the embodiments of the apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

We claim:

1. An artificial intelligence system comprising:
   a storage device comprising a terminology database that stores (i) a plurality of terms utilized in a previous communication by a human user requesting a product and/or a service in a first spoken language, (ii) a plurality of responses in a second spoken language to the previous communication, and (iii) a plurality of outcomes that indicate accuracy of a correspondence between the plurality of responses in the second spoken language and the plurality of terms in the first spoken language, the second spoken language being distinct from the first spoken language; and
   a processor that (i) learns to generate responses associated with corresponding terms in a request based upon a statistical probability analysis of the plurality of outcomes from the terminology database, (ii) receives a request for a product and/or service in the first spoken language in a current communication in which a human language interpreter is not available, (iii) selects a phrase in the first spoken language from the terminology database based on an occurrence of a term in the first spoken language in the request and a substantial probability of the phrase provided in the first spoken language in conjunction with the term in the first spoken language eliciting particular follow-up data from the human user, (iv) provides the phrase in the second spoken language to an entity representative that participates in the current communication, (v) generates a response to the human user in the first spoken language to obtain the particular follow-up data from the human user in the first spoken language to facilitate ordering the product and/or service, (vi) provides the particular follow-up data received from the user in the second spoken language to the entity representative for the entity representative to order the product and/or service, and (vii) auto-populates at least one question for a requestor of the product and/or the service in the first spoken language and sends the at least one question to the requestor.

2. The artificial intelligence system of claim 1, wherein the processor receives the request from an entity representative workstation subsequent to the entity representative workstation receiving an indication that a language interpretation platform does not have an available human language interpreter to perform language interpretation between the spoken language and the additional spoken language.

3. The artificial intelligence system of claim 1, wherein the processor generates a message that is a language interpretation from the first spoken language to the second spoken language.

4. The artificial intelligence system of claim 1, wherein the processor generates the message based upon at least one answer to the at least one question received from the requestor.

5. The artificial intelligence system of claim 4, wherein the message is an order for the product and/or the service composed in the second spoken language.

6. The artificial intelligence system of claim 1, wherein the product and/or the service are associated with an emergency response system.

7. The artificial intelligence system of claim 1, wherein the communication is selected from the group consisting of voice, audio, video, image, and text.

8. A computer program product comprising a non-transitory computer readable storage device having a computer readable program stored thereon, wherein the computer readable program when executed on a computer causes the computer to:
   store a plurality of terms utilized in a previous communication by a human user requesting a product and/or a service in a first spoken language;
   store a plurality of responses in a second spoken language to the previous communication;
   store a plurality of outcomes that indicate accuracy of a correspondence between the plurality of responses in the second spoken language and the plurality of terms in the first spoken language, the second spoken language being distinct from the first spoken language;

learn, with a processor, to generate responses associated with corresponding terms in a request based upon a statistical probability analysis of the plurality of outcomes from the terminology database;

receive, with the processor, a request for a product and/or service in the first spoken language in a current communication in which a human language interpreter is not available;

select, with the processor, a phrase in the first spoken language from the terminology database based on an occurrence of a term in the first spoken language in the request and a substantial probability of the phrase provided in the first spoken language in conjunction with the term eliciting particular follow-up data from the human user;

provide, with the processor, the phrase in the second spoken language to an entity representative that participates in the current communication;

generate, with the processor, a response to the human user to obtain the particular follow-up data from the human user to facilitate ordering the product and/or service;

provide the particular follow-up data received from the user in the second spoken language to the entity representative for the entity representative to order the product and/or service; and auto-populate at least one question for a requestor of the product and/or the service in the first spoken language and sends the at least one question to the requestor.

9. The computer program product of claim 8, wherein the computer is further caused to receive the request from an entity representative workstation subsequent to the entity representative workstation receiving an indication that a language interpretation platform does not have an available human language interpreter to perform language interpretation between the spoken language and the additional spoken language.

10. The computer program product of claim 8, wherein the computer is further caused to generate, with the processor, a message that is a language interpretation from the first spoken language to the second spoken language.

11. The computer program product of claim 8, wherein the processor generates the message based upon at least one answer to the at least one question received from the requestor.

12. The computer program product of claim 8, wherein the message is an order for the product and/or the service composed in the second spoken language.

13. The computer program product of claim 8, wherein the product and/or the service are associated with an emergency response system.

14. The computer program product of claim 8, wherein the communication is selected from the group consisting of voice, audio, video, image, and text.

15. A method comprising:
storing a plurality of terms utilized in a previous communication by a human user requesting a product and/or a service in a first spoken language;

storing a plurality of responses in a second spoken language to the previous communication;

storing a plurality of outcomes that indicate accuracy of a correspondence between the plurality of responses in the second spoken language and the plurality of terms in the first spoken language, the second spoken language being distinct from the first spoken language;

learning, with a processor, to generate responses associated with corresponding terms in a request based upon an analysis of the plurality of outcomes from the terminology database;

receiving, with the processor, a request for a product and/or service in the first spoken language in a current communication in which a human language interpreter is not available;

selecting, with the processor, a phrase in the first spoken language from the terminology database based on an occurrence of a term in the first spoken language in the request and a substantial probability of the phrase provided in the first spoken language in conjunction with the term eliciting particular follow-up data from the human user;

providing, with the processor, the phrase in the second spoken language to an entity representative that participates in the current communication;

generating, with the processor, a response to the human user to obtain the particular follow-up data from the human user to facilitate ordering the product and/or service;

providing the particular follow-up data received from the user in the second spoken language to the entity representative for the entity representative to order the product and/or service; and auto-populating at least one question for a requestor of the product and/or the service in the first spoken language and sends the at least one question to the requestor.

16. The method of claim 15, further comprising receiving the request from an entity representative workstation subsequent to the entity representative workstation receiving an indication that a language interpretation platform does not have an available human language interpreter to perform language interpretation between the spoken language and the additional spoken language.

17. The method of claim 15, further comprising generating, with the processor, a message that is a language interpretation from the first spoken language to the second spoken language.

* * * * *